US012319803B2

(12) United States Patent
Lee et al.

(10) Patent No.: US 12,319,803 B2
(45) Date of Patent: Jun. 3, 2025

(54) LOW-DENSITY POLYURETHANE FOAM COMPOSITION AS SOUND-ABSORBING MATERIAL HAVING IMPROVED APPEARANCE FORMABILITY, SMELL REDUCTION AND SOUND ABSORPTION PERFORMANCE, METHOD FOR MANUFACTURING POLYURETHANE FOAM AND POLYURETHANE FOAM MANUFACTURED THEREFROM

(71) Applicants: HYUNDAI MOTOR COMPANY, Seoul (KR); KIA CORPORATION, Seoul (KR); PIUSYS CO., LTD., Paju-si (KR); NVH KOREA, INC., Ulsan (KR)

(72) Inventors: Jung Wook Lee, Bucheon-si (KR); Se Hoon Kim, Seongnam-si (KR); Ji Wan Kim, Hwaseong-si (KR); Jin Hyung Lee, Hwaseong-si (KR); Seong Je Kim, Yeosu-si (KR); Dae Yong Kim, Suwon-si (KR); Jong Hyun Ryu, Ansan-si (KR); Myung Sik Lee, Suwon-si (KR); Min Seo Wu, Goyang-si (KR)

(73) Assignees: Hyundai Motor Company, Seoul (KR); Kia Corporation, Seoul (KR); PIUSYS Co., Ltd., Paju-si (KR); NVH Korea, Inc., Ulsan (KR)

( * ) Notice: Subject to any disclaimer, the term of this patent is extended or adjusted under 35 U.S.C. 154(b) by 54 days.

(21) Appl. No.: 18/221,194

(22) Filed: Jul. 12, 2023

(65) Prior Publication Data
US 2023/0374241 A1 Nov. 23, 2023

Related U.S. Application Data

(62) Division of application No. 17/000,640, filed on Aug. 24, 2020, now Pat. No. 11,746,203.

(30) Foreign Application Priority Data

Sep. 30, 2019 (KR) .................. 10-2019-0120467

(51) Int. Cl.
| | | |
|---|---|---|
| B29C 44/02 | (2006.01) |
| C08G 18/08 | (2006.01) |
| C08G 18/10 | (2006.01) |
| C08G 18/16 | (2006.01) |
| C08G 18/18 | (2006.01) |
| C08G 18/20 | (2006.01) |
| C08G 18/32 | (2006.01) |
| C08G 18/48 | (2006.01) |
| C08G 18/66 | (2006.01) |
| C08G 18/70 | (2006.01) |
| C08J 9/00 | (2006.01) |
| C08J 9/04 | (2006.01) |
| G10K 11/162 | (2006.01) |

(52) U.S. Cl.
CPC ............ *C08J 9/0061* (2013.01); *C08G 18/10* (2013.01); *C08G 18/18* (2013.01); *C08G 18/3203* (2013.01); *C08G 18/4804* (2013.01); *C08G 18/70* (2013.01); *C08G 2110/005* (2021.01); *C08G 2110/0058* (2021.01); *C08G 2350/00* (2013.01); *C08J 2375/08* (2013.01)

(58) Field of Classification Search
None
See application file for complete search history.

(56) References Cited

U.S. PATENT DOCUMENTS

| 2013/0225705 A1 | 8/2013 | Plaver |
| 2015/0018444 A1* | 1/2015 | Garbark ............. C08G 18/7657 524/590 |

FOREIGN PATENT DOCUMENTS

| CN | 107022054 A | 8/2017 |
| CN | 109563227 A | 4/2019 |
| JP | 2005248146 A * | 9/2005 |
| JP | 2013087229 A * | 5/2013 |
| KR | 10-2013-0125526 A | 11/2013 |
| KR | 10-1797462 B1 | 11/2017 |
| WO | 2018/026506 A1 | 2/2018 |
| WO | 2018/136258 A1 | 7/2018 |

OTHER PUBLICATIONS

Machine translation of JP-2013087229-A obtained from Clarivate Analytics in Oct. 2024 (Year: 2024).*
Machine translation of JP-2005248146-A obtained from the European Patent Office in Oct. 2024 (Year: 2024).*
U.S. Notice of Allowance dated Jun. 13, 2023 issued in U.S. Appl. No. 17/000,640.
Non-final Office Action dated Dec. 28, 2022 issued in U.S. Appl. No. 17/000,640.
Final Office Action dated Jun. 30, 2022 issued in U.S. Appl. No. 17/000,640.
Non-final Office Action dated Dec. 29, 2021 issued in U.S. Appl. No. 17/000,640.

* cited by examiner

*Primary Examiner* — Melissa A Rioja
(74) *Attorney, Agent, or Firm* — Morgan Lewis & Bockius LLP

(57) ABSTRACT

Disclosed are a polyurethane foam composition for sound-absorbing materials, a method for manufacturing a polyurethane foam and a polyurethane foam manufactured using the method. Particularly, disclosed are a composition containing a polyol mixture including a polyol and an additive, and isocyanate, and the manufacture of a low-density polyurethane foam for sound-absorbing materials, which is imparted with improved appearance formability, reduced smell and enhanced sound absorption performance by controlling the content of the composition and the conditions for foaming the composition.

4 Claims, 3 Drawing Sheets

LOW-DENSITY POLYURETHANE FOAM COMPOSITION AS SOUND-ABSORBING MATERIAL HAVING IMPROVED APPEARANCE FORMABILITY, SMELL REDUCTION AND SOUND ABSORPTION PERFORMANCE, METHOD FOR MANUFACTURING POLYURETHANE FOAM AND POLYURETHANE FOAM MANUFACTURED THEREFROM

CROSS-REFERENCE TO RELATED APPLICATION

This application is a divisional patent application of U.S. patent application Ser. No. 17/000,640, filed on Aug. 24, 2020, which claims priority to and the benefit of Korean Patent Application No. 10-2019-0120467, filed on Sep. 30, 2019, which is incorporated herein by reference in its entirety.

FIELD

The present disclosure relates to a polyurethane foam composition for sound-absorbing materials, a method for manufacturing a polyurethane foam, and a polyurethane foam manufactured using the method. More particularly, the present disclosure relates to a composition containing a polyol mixture including a polyol and an additive, and isocyanate, and the manufacture of a low-density polyurethane foam for sound-absorbing materials, which is imparted with improved appearance formability, reduced smell and enhanced sound absorption performance by controlling the content of the composition and the conditions for foaming the composition.

BACKGROUND

The statements in this section merely provide background information related to the present disclosure and may not constitute prior art.

In order to reduce the weight of automobiles, the physical properties of lightweight alternative materials should be comparable or superior to those of conventional materials.

In particular, physical flowability, pertaining to the viscosity of the stock (crude) solution, and chemical flowability, pertaining to the foaming reaction behavior, are very important for molding of a dash isolation (iso) pad because these factors may cause defects of non-molding of the end part during molding to manufacture foam. When the weight of fed materials is increased to thus solve the molding problem, the weight of the product is increased, thus making it difficult to achieve weight reduction.

In general, the structure of cells constituting polyurethane foam used to increase sound absorption should be designed such that there are more open cells (continuous foam) than closed cells (individual foam), and a higher density is advantageous.

Meanwhile, interior materials for automobiles are advantageous when they are lighter within the range in which performance is maintained. As the weight of interior materials, including the dash isolation pad, increases, the weight of the car body increases, which adversely affects fuel economy. Thus, there is a need for the development of high-foaming polyurethane foams that satisfy formability despite the increase in manufacturing costs due to the weight thereof.

For this reason, a method of reducing the weight of interior materials has been studied, but with respect to polyurethane foams for dash isolation pads, simply increasing the content of the foaming agent to lower the density may lower the moldability and fail to satisfy the appearance as well as cause deterioration in sound absorption performance and physical properties such as tensile and tear strength.

Meanwhile, in order to improve sound absorption, fillers such as carbon nanotubes, calcium carbonate, graphite and magnesium hydroxide have been commonly used in polyurethane foam compositions, but such fillers may cause problems such as formation of precipitates or layer separation in the polyurethane foam composition.

The above information disclosed in this Background section is provided only for enhancement of understanding of the background of the present disclosure and therefore may contain information that does not form the prior art that is already known in this country to a person of ordinary skill in the art.

SUMMARY

The present disclosure has been made in an effort to solve the above-described problems associated with the prior art.

The present disclosure provides a polyurethane foam having a low density, satisfactory die formability and improved sound absorption performance, compared to conventional polyurethane foams.

The present disclosure provides a method for improving sound absorption without using fillers such as carbon nanotubes, calcium carbonate, graphite and magnesium hydroxide, which are generally used to improve sound absorption performance.

The present disclosure provides a polyurethane foam with reduced odor.

The present disclosure are not limited to those described above. The present disclosure will be clearly understood from the following description and can be implemented by the means defined in the claims and a combination thereof.

In one aspect, the present disclosure provides a low-density polyurethane foam composition for sound-absorbing materials including a polyol mixture including a polyol, and at least one additive selected from the group consisting of a catalyst, a cell opener, a chain extender, a crosslinking agent, a foaming agent, a surfactant, a reducing agent and combinations thereof, and isocyanate, wherein the catalyst includes a gelling catalyst and a blowing catalyst.

The polyol may include a first polyol having a molecular weight of 5,500 to 6,500 and a hydroxyl (OH) value of 26 to 30, and containing 14 to 16% of ethylene oxide (EO), and a second polyol having a molecular weight of 500 to 1,500 and a hydroxyl value of 110 to 114.

The catalyst may include the gelling catalyst including at least one of a primary alcohol and a secondary alcohol, and the blowing catalyst including at least one of a primary alcohol and a secondary alcohol.

The gelling catalyst may include at least one of 1,4-diazabicyclo[2,2,2]octane-2-methanol, N-(3-dimethylaminopropyl)-N,N-diisopropanolamine, or N,N-bis(3-dimethylaminopropyl)-N-isopropanolamine), and the blowing catalyst may include at least one of N,N,N'-trimethyl-N'-hydroxyethyl-bis(aminoethyl)ether or N,N-dimethylethanolamine.

The cell opener may have a molecular weight of 3,800 to 4,600 and a hydroxyl value of 37 to 43, and contain 65 to 75% by weight of ethylene oxide (EO).

The cell opener may include at least one of glycerol propoxylate, ethoxylate, or a glycerol propoxylate-ethoxylate copolymer.

The chain extender may have a molecular weight of 350 to 450 and a hydroxyl value of 270 to 290.

The cross-linking agent may have a molecular weight of 100 to 110 and a hydroxyl value of 1,600 to 1,650.

The foaming agent may have a molecular weight of 10 to 30 and a hydroxyl value of 6,230 to 6,235.

The polyol mixture may include 19.8 to 24.0 parts by weight of the additive based on 100 parts by weight of the polyol.

The polyol mixture may include 4.4 to 6.4 parts by weight of the cell opener, 3.3 to 4.3 parts by weight of the catalyst, 1.0 to 1.4 parts by weight of the chain extender, 0.55 to 0.65 parts by weight of the crosslinking agent, 4.85 to 4.95 parts by weight of the foaming agent, 3.4 to 4.4 parts by weight of the surfactant, and 2.3 to 2.5 parts by weight of the reducing agent based on 100 parts by weight of the polyol.

The polyol mixture may include 3.0 to 3.8 parts by weight of the gelling catalyst, and 0.3 to 0.5 parts by weight of the blowing catalyst based on 100 parts by weight of the polyol.

The polyol may include 92 to 94% by weight of the first polyol and 6 to 8% by weight of the second polyol.

The polyurethane foam composition may include the isocyanate in an amount of 40 to 60 parts by weight based on 100 parts by weight of the polyol mixture.

In another aspect, the present disclosure also provides a method of manufacturing a low-density polyurethane foam for sound-absorbing materials including adding an additive to a polyol to prepare a polyol mixture, adding isocyanate to the polyol mixture to prepare a polyurethane foam composition, and foaming the polyurethane foam composition, wherein the catalyst includes a gelling catalyst and a blowing catalyst.

The polyol mixture may be stirred at 1,500 to 1,800 rpm for 30 to 60 minutes after adding the additive to the polyol, and the polyurethane foam composition may be stirred at 6,000 to 8,000 rpm after adding the isocyanate to the polyol mixture.

The polyurethane foam composition may be foamed in a die, a pressure of the foaming may be 120 to 160 bar, a temperature of the polyurethane foam composition may be 18 to 28° C., and a temperature of the die may be 50 to 70° C.

In another aspect, the present disclosure provides a low-density polyurethane foam for sound-absorbing materials manufactured by the method, having a density of less than 75 kg/m³.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
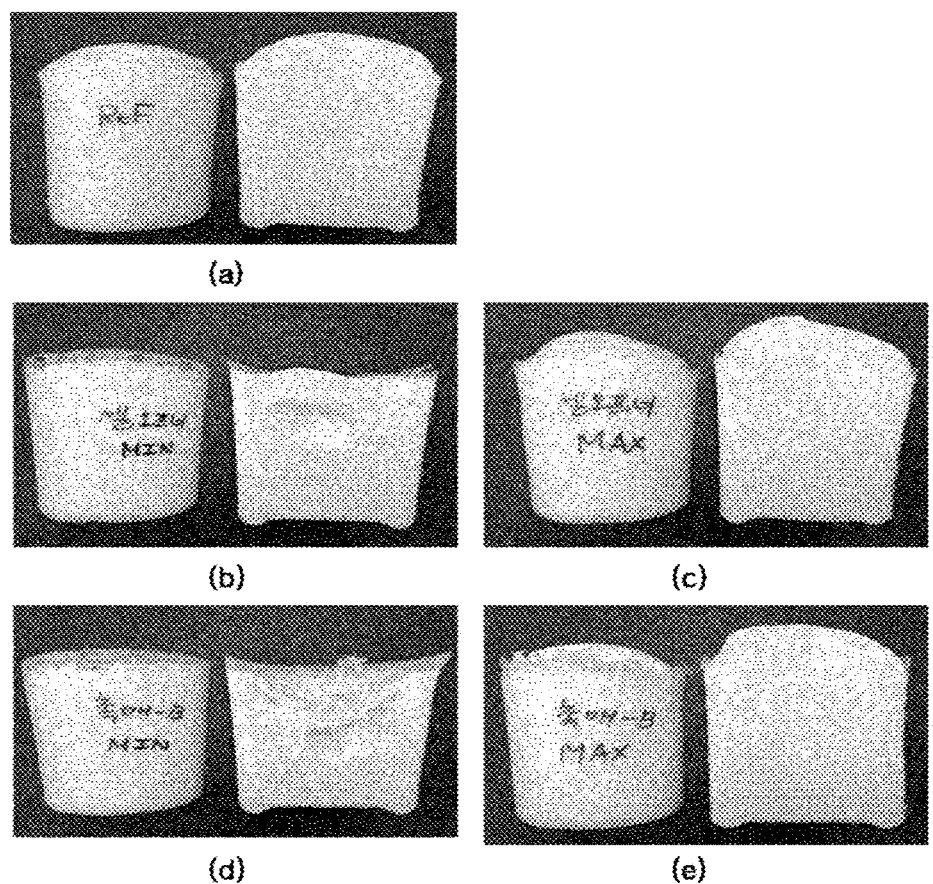
FIG. 1 shows the appearance and cross-section of polyurethane foams manufactured using the polyurethane foam compositions of Example 1 and Comparative Examples 1 to 4.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. In the drawings, the sizes of structures are exaggerated for clarity. It will be understood that, although the terms "first", "second", etc. may be used herein to describe various elements, these elements should not be construed to be limited by these terms, which are used only to distinguish one element from another. For example, within the scope defined by the present disclosure, a "first" element may be referred to as a "second" element, and similarly, the "second" element may be referred to as the "first" element. Singular forms are intended to include plural forms as well, unless the context clearly indicates otherwise.

It will be further understood that the terms "comprises" and/or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. In addition, when numerical ranges are disclosed in the description, these ranges are continuous and include all numbers from the minimum to the maximum including the maximum within each range unless otherwise defined. Furthermore, when the range refers to an integer, it includes all integers from the minimum to the maximum including the maximum within the range, unless otherwise defined.

It should be understood that, in the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range.

In addition, for example, the range of "10% to 30%" encompasses all integers that include numbers such as 10%, 11%, 12% and 13% as well as 30%, and any sub-ranges of 10% to 15%, 12% to 18%, or 20% to 30%, as well as any numbers, such as 10.5%, 15.5% and 25.5%, between appropriate integers that fall within the range.

The present disclosure relates to a low-density polyurethane foam composition for sound-absorbing materials having excellent appearance formability, reduced odor and enhanced sound absorption performance, a method for manufacturing a polyurethane foam, and a polyurethane foam manufactured by the method.

The low-density polyurethane foam composition according to the present disclosure includes a polyol mixture including a polyol and at least one additive selected from the group consisting of a catalyst, a cell opener, a chain extender, a crosslinking agent, a foaming agent, a surfactant, a reducing agent and a combination thereof, and isocyanate.

The polyol of the present disclosure is an organic compound having two or more hydroxyl groups (—OH) at the end thereof, and is a main component for realizing the properties of the polyurethane foam of the present disclosure.

The polyol includes a first polyol having a molecular weight of 5,500 to 6,500 and a hydroxyl (OH) value of 26 to 30, and containing 14 to 16% of ethylene oxide (EO) and a second polyol having a molecular weight of 500 to 1,500 and a hydroxyl value of 110 to 114.

The first polyol preferably has a trifunctional group and the second polyol preferably has a bifunctional group.

The polyol of the present disclosure includes 92 to 94% by weight of the first polyol and 6 to 8% by weight of the second polyol.

The catalyst of the present disclosure includes a gelling catalyst and a blowing catalyst.

The gelling catalyst includes at least one of a primary alcohol or a secondary alcohol, and the blowing catalyst includes at least one of a primary alcohol or a secondary alcohol.

More specifically, the gelling catalyst is a catalyst for facilitating the reaction (gelling reaction) between polyol and isocyanate, and preferably includes at least one of 1,4-diazabicyclo[2,2,2]octane-2-methanol, N-(3-dimethylaminopropyl)-N,N-diisopropanolamine, or N,N-bis(3-dimethylaminopropyl)-N-isopropanolamine).

The blowing catalyst is a catalyst for facilitating the reaction (saturation reaction) of isocyanate with water, and preferably includes at least one of N,N,N'-trimethyl-N'-hydroxyethyl-bis(aminoethyl)ether, or N,N-dimethylethanolamine.

In the present disclosure, the gelling catalyst is present in an amount of 3.0 to 3.8 parts by weight, preferably 3.0 to 3.5 parts by weight, and more preferably 3.0 to 3.2 parts by weight, based on 100 parts by weight of the polyol of the present disclosure. When the content of the gelling catalyst is less than 3.0 parts by weight, there is a problem of curability due to the insufficient gelling reaction of the polyurethane foam of the present disclosure, and when the content of the gelling catalyst is more than 3.8 parts by weight, the gelling reaction is facilitated, the flowability is deteriorated, the density is increased, and the effect of reducing odors by the catalyst and economic efficiency are thus deteriorated.

The blowing catalyst is present in an amount of 0.3 to 0.5 parts by weight based on 100 parts by weight of polyol. When the blowing catalyst is present in an amount less than 0.3 parts by weight, the foaming efficiency is lowered due to the delayed saturation reactivity of the polyurethane foam, and the inside of the foam collapses due to the partial insufficient curing, which may cause defects during molding such as poor appearance or molding failure due to cell agglomeration and cracking of interference parts. When the blowing catalyst is present in an amount of more than 0.5 parts by weight, the shape of the cell is elongated in the foaming direction due to the excessive saturation (gelling) of the polyurethane foam, thus increasing the generation of pores (voids) and accelerating the internal reaction of the polyurethane foam to increase the number of closed cells. This may cause a deterioration in sound absorption performance due to shrinkage and deteriorated open property.

The cell opener of the present disclosure functions to partially finely open cells formed inside the foam, and has a molecular weight of 3,800 to 4,600, a trifunctional group, and a hydroxyl value of 37 to 43, and contains ethylene oxide (EO) in an amount of 65 to 75% by weight.

For example, the cell opener of the present disclosure may include at least one of glycerol propoxylate, ethoxylate, or a glycerol propoxylate-ethoxylate copolymer, and preferably includes a glycerol propoxylate-ethoxylate copolymer.

The cell opener is present in an amount of 4.4 to 6.4 parts by weight based on 100 parts by weight of the polyol of the present disclosure. When the cell opener is present in an amount of less than 4.4 parts by weight, the polyurethane foam may shrink due to the increased number of closed cells, and when the content of the foaming agent of the present disclosure satisfies 4.85 parts by weight or more based on 100 parts by weight of polyol, the polyurethane foam fails to withstand excess gas ($CO_2$) during foaming and the inside thereof collapses, and 5% or more of the polyurethane foam is settled after foaming, resulting in deteriorated overall foaming efficiency, increased foaming density and deteriorated sound absorption performance. In addition, when the cell opener exceeds 6.4 parts by weight and the content of the foaming agent satisfies 4.85 parts by weight or more based on 100 parts by weight of polyol, as the content of the cell opener increases, the number of irregular open cells increases and the size of cells increases due to the large amount of gas generated during the foaming reaction, resulting in the formation of more voids, a settling proportion of 5% or more after foaming due to excessive open cells, and lower foaming efficiency. As a result, compared to a fine and uniform cell open state, the sound absorption path may be relatively short, and sound absorption performance may be reduced.

The chain extender is a substance that extends the main chain of the polymer and is used to impart chemical flowability and cell stabilization in the present disclosure. The chain extender of the present disclosure preferably has a molecular weight of 350 to 450, a bifunctional group and a hydroxyl value of 270 to 290.

The chain extender is present in an amount of 0.5 to 1% by weight in the polyol mixture of the present disclosure.

The chain extender of the present disclosure may be used in the technical field of the polyurethane foam and may be used without particular limitation as long as the chain extender conditions are satisfied.

The crosslinking agent is a substance for forming a polymer chain in the form of a branched chain or a net (mesh) structure. In the present disclosure, the crosslinking agent is used to impart firmness and cell stabilization to the polyurethane foam. The crosslinking agent of the present disclosure preferably has a molecular weight of 100 to 110, a trifunctional group, and a hydroxyl value of 1,600 to 1,605.

The crosslinking agent is present in an amount of 0.5 to 1% by weight in the polyol mixture of the present disclosure.

The crosslinking agent of the present disclosure may be used in the polyurethane foam field without particular limitation as long as the crosslinking agent conditions are satisfied.

The foaming agent of the present disclosure is a substance used to manufacture foams, which has a molecular weight of 10 to 30, a bifunctional group and a hydroxyl value of 6,230 to 6,235.

The foaming agent is present in an amount of 2 to 5% by weight in the polyol mixture of the present disclosure.

The foaming agent of the present disclosure may be used in the polyurethane foam field without particular limitation as long as the foaming agent conditions are satisfied.

The surfactant of the present disclosure affects the cell structure in the foam due to the surfactant effect, and affects the mixing property of raw materials, stability, bubble generation, bubble stability and the like.

The surfactant is a silicone-based stabilizer and is used to inhibit cell collapse, increase structural stability and impart elastic force, and is further applied to provide cell opening, and also to make the cells dense and homogeneous to thus impart stability to the cells.

It is sufficient for the surfactant of the present disclosure to be a silicone surfactant commonly used in the technical field of the polyurethane foam. For example, it is sufficient to include at least one of organo polysiloxane, or organo modified polysiloxane, and there is no particular limitation in the present disclosure.

The surfactant of the present disclosure may be used in the polyurethane foam technical field, and may be used without particular limitation, as long as the surfactant conditions are satisfied.

The basic surfactant is present in an amount of 3.4 to 4.4 parts by weight based on 100 parts by weight of the polyol of the present disclosure.

The reducing agent of the present disclosure is an adsorbent for removing formaldehyde (HCHO) generated in the polyurethane foaming process, and has a moisture content of 25 to 30%. Carbon, having a partial negative charge, and oxygen, having a partial positive charge, among the carbonyl contained in aldehyde such as formaldehyde are in contact with the hydroxyl group (—OH) of the reducing agent through electrostatic attraction and form a hydrogen bond, resulting in chemisorption through form conversion and recombination. Thus, there are no secondary problems such as desorption or re-decomposition.

The reducing agent is present in an amount of 2.3 to 2.5 parts by weight based on 100 parts by weight of the polyol of the present disclosure. Any reducing agent can be used without particular limitation as long as it can be used in the technical field of the polyurethane foam and satisfies the conditions for the reducing agent.

The isocyanate of the present disclosure has an NCO content of 34.5 to 35.5% and an NCO index of 0.5 to 0.9.

The isocyanate is present in an amount of 40 to 60 parts by weight based on 100 parts by weight of the polyol mixture in the polyurethane foam composition of the present disclosure.

The polyol mixture of the present disclosure includes 4.4 to 6.4 parts by weight of the cell opener, 3.3 to 4.3 parts by weight of the catalyst, 1.0 to 1.4 parts by weight of the chain extender, 0.55 to 0.65 parts of the crosslinking agent, 4.85 to 4.95 parts by weight of the foaming agent, 3.4 to 4.4 parts by weight of the surfactant, and 2.3 to 2.5 parts by weight of the reducing agent based on 100 parts by weight of the polyol including the first polyol and the second polyol, and the polyurethane foam composition of the present disclosure includes isocyanate in an amount of 40 to 60 parts by weight based on 100 parts by weight of the polyol mixture.

The method of manufacturing the polyurethane foam according to the present disclosure includes adding an additive to a polyol to prepare a polyol mixture, adding isocyanate to the polyol mixture to prepare a polyurethane foam composition, and foaming the polyurethane foam composition.

In the step of adding the additive to the polyol, the polyol mixture is preferably stirred at 1,500 to 1,800 rpm for 30 to 60 minutes.

In the step of adding the isocyanate, the polyurethane foam composition is preferably stirred at 6,000 to 8,000 rpm.

In the step of foaming the polyurethane foam composition, the polyurethane foam composition may be foamed in a die, the foaming pressure is preferably 120 to 160 bar, the temperature of the polyurethane foam composition is preferably 18 to 28° C., and the temperature of the die is preferably 50 to 70° C.

According to the present disclosure, a low-density polyurethane foam can be produced as a material for absorbing sound using the aforementioned production method. In this case, the sound absorption rate (vertical sound absorption rate in frequency band of 0.4 to 5 kHz) is 0.70 or more, and the density is less than 75 kg/m$^3$ under the condition of a foam thickness of 10 to 50 mm. Preferably, the polyurethane foam for automobile dash isolation pads is manufactured by the above manufacturing method.

Hereinafter, the present disclosure will be described in more detail with reference to specific examples. However, the following examples are provided only for better understanding of the present disclosure, and should not be construed as limiting the scope of the present disclosure.

Example 1

A polyol including 93% by weight of a first polyol, including a polypropylene glycol having a molecular weight of 6,000, a hydroxyl value of 28 and an ethylene oxide content of 15%, and 7% by weight of a second polyol, including a polypropylene glycol having a molecular weight of 1,000 and a hydroxyl value of 112, was prepared, and an additive including 3.1 parts by weight of a gelling catalyst including 1,4-diazabicyclo[2,2,2]octane-2-methanol, 0.6 parts by weight of a crosslinking agent including diethanolamine having a molecular weight of 105, 1.2 parts by weight of a chain extender containing ethylene glycol having a molecular weight of 400, 4.9 parts by weight of a foaming agent containing water, 3.4 parts by weight of a surfactant including L-3002 (Momentive Corp.) and 2.4 parts by weight of a reducing agent (TS-NVS), based on 100 parts by weight of the polyol, was prepared. A cell opener (glycerol propoxylate-ethoxylate copolymer), having a molecular weight of 42,00, a hydroxyl value of 40 and an EO content of 60%, and a blowing catalyst containing N,N,N'-trimethyl-N'-hydroxyethyl-bis(aminoethyl) ether were prepared in 5.4 parts by weight and 0.4 parts by weight, respectively, based on 100 parts by weight of the polyol, and were further added to the additive to prepare a polyol mixture, the polyol mixture was stirred at 1,600 rpm for 30 minutes, and 47 parts by weight of isocyanate (NCO content: about 35%, NCO index: 0.78) was mixed with 100 parts by weight of the polyol mixture, followed by stirring at 6,000 rpm to prepare a polyurethane foam composition, and the polyurethane foam composition was maintained at a temperature of 20° C., and was foamed in a die having a temperature of 55° C. at a pressure of 130 bar to produce a polyurethane foam (200 mm×200 mm×20 mm).

Examples 2 to 7

Polyurethane foams were produced in the same process as in Example 1, except that the content of the cell opener was adjusted as shown in Table 1 (based on 100 parts by weight of the polyol).

TABLE 1

|  | Gelling catalyst | Crosslinking agent | Chain extender | Foaming agent | Surfactant | Reducing agent | Cell opener | Blowing catalyst |
|---|---|---|---|---|---|---|---|---|
| Example 1 | 3.1 | 0.6 | 1.2 | 4.9 | 3.4 | 2.4 | 5.4 | 0.4 |
| Example 2 | 3.1 | 0.6 | 1.2 | 4.9 | 3.4 | 2.4 | 4.6 | 0.4 |
| Example 3 | 3.1 | 0.6 | 1.2 | 4.9 | 3.4 | 2.4 | 4.8 | 0.4 |
| Example 4 | 3.1 | 0.6 | 1.2 | 4.9 | 3.4 | 2.4 | 5.2 | 0.4 |
| Example 5 | 3.1 | 0.6 | 1.2 | 4.9 | 3.4 | 2.4 | 5.8 | 0.4 |
| Example 6 | 3.1 | 0.6 | 1.2 | 4.9 | 3.4 | 2.4 | 6.1 | 0.4 |
| Example 7 | 3.1 | 0.6 | 1.2 | 4.9 | 3.4 | 2.4 | 6.3 | 0.4 |

Comparative Examples 1 and 2

Polyurethane foams were produced in the same process as in Example 1, except that the content of the cell opener was adjusted to 4 parts by weight and 7 parts by weight based on 100 parts by weight of the polyol, respectively.

Comparative Examples 3 and 4

Polyurethane foams were produced in the same process as in Example 1, except that the content of the blowing catalyst was adjusted to 0.2 parts by weight and 0.6 parts by weight based on 100 parts by weight of the polyol, respectively.

Comparative Example 5

A polyurethane foam was produced in the same process as in Example 1, except that the content of the cell opener was adjusted to 3.0 parts by weight based on 100 parts by weight of polyol, the content of the blowing catalyst was adjusted to 0.1 parts by weight and the content of the foaming agent was adjusted to 4.0 parts by weight.

Comparative Examples 6 and 7

Polyurethane foams were produced in the same process as in Example 1, except that the content of the blowing catalyst was adjusted to 2.8 parts by weight and 4.0 parts by weight, based on 100 parts by weight of polyol, respectively.

Experimental Example 1

The polyurethane foam compositions prepared in Example 1 and Comparative Examples 1 to 4 were maintained at a temperature of 20° C. and then foamed in a cup-shaped molding die at a pressure of 130 bar to produce a polyurethane foam. The cross-section of the produced polyurethane foam was cut to check the internal state of the polyurethane foam (FIG. 1A=Example 1, FIG. 1B=Comparative Example 1, FIG. 1C=Comparative Example 2, FIG. 1D=Comparative Example 3, FIG. 1E=Comparative Example 4).

As can be seen from FIG. 1A, the foam has a good appearance and the inner cell is formed uniformly, and as can be seen from FIG. 1B, overall, the foam is shrunk and has an internal structure including a large and round cavity due to the confinement of generated gas and the broken cells. As can be seen from FIG. 1C, the overall appearance was good, but the foam is irregularly shrunk. As can be seen from FIG. 1D, the foaming of the polyurethane foam is not complete and the curing is insufficient, resulting in the collapse of the interior structure and the cells being frequently aggregated and cracked. As can be seen from FIG. 1E, the polyurethane foam is excessively foamed, generating more voids inside.

Experimental Example 2

The density, tensile strength, elongation, tear strength and vertical incidence sound absorption coefficient of the polyurethane foams prepared in Examples 1 to 7 were measured and are shown in Table 2 below. At this time, the tensile strength, elongation and tear strength were measured using a dumbbell type No. 1 in accordance with the MS341-18 standard, and the sound absorption performance was evaluated as an arithmetic mean value through measurement in the frequency band of 0.4 to 5 kHz by the impedance tube method (29ψ).

TABLE 2

| Item | Density (kg/m$^3$) | Tensile strength (kgf/cm$^2$) | Tear strength (kgf/cm$^2$) | Vertical incidence sound absorption |
|---|---|---|---|---|
| Example 1 | 75 | 0.9 | 0.90 | 0.81 |
| Example 2 | 73 | 1.2 | 1.12 | 0.74 |
| Example 3 | 74 | 1.3 | 1.24 | 0.77 |
| Example 4 | 75 | 1.0 | 0.95 | 0.80 |
| Example 5 | 75 | 1.3 | 0.88 | 0.79 |
| Example 6 | 76 | 1.5 | 0.89 | 0.73 |
| Example 7 | 75 | 1.3 | 0.80 | 0.71 |

* Physical properties are evaluated based on:
(tensile strength of 0.6 kgf/cm$^2$ or more· and tear strength of 0.25 kgf/cm$^2$ or more)

As can be seen from the results of Table 2, all of the polyurethane foams have a low density of 76 kg/m$^3$ or less and thus have low-density characteristics and excellent sound absorption performance, and satisfy the evaluation criteria for both tensile strength and tear strength.

Experimental Example 3

A polyurethane foam was produced from the polyurethane foam composition prepared in Example 1 under the conditions of the following Table 3 (die temperature, polyurethane foam composition temperature (=stock solution temperature), and foaming pressure) and absorption coefficient (Alpha Cabin (ISO 345)) of the polyurethane form was evaluated (B is the same as the polyurethane foam of Example 1).

TABLE 3

| Item | Stock solution temperature (° C.) | Die temperature (° C.) | Foaming pressure (bar) | Forming density (K) | Sound absorption proportion* |
|---|---|---|---|---|---|
| A | 20 | 45 | 110 | 76 | 0.56 |
| B | 20 | 55 | 130 | 75 | 0.78 |
| C | 20 | 65 | 150 | 73 | 0.85 |
| D | 25 | 45 | 110 | 73 | 0.60 |
| E | 25 | 55 | 130 | 75 | 0.75 |
| F | 25 | 65 | 150 | 75 | 0.77 |
| G | 30 | 45 | 110 | 74 | 0.55 |
| H | 30 | 55 | 130 | 73 | 0.64 |
| I | 30 | 65 | 150 | 75 | 0.63 |

*Sound absorption proportion is expressed as arithmetic mean value in 0.4 to 10 kHz As can be seen from Table 3 above, when the die temperature is increased and the foaming pressure is increased (stock solution temperature: 20° C., die temperature: 65° C., foam pressure: 150 bar) compared to the conventional production conditions (stock solution temperature: 20° C., die temperature: 55° C., foam pressure: 130 bar) of Example 1, cell aggregation was minimized, resulting in excellent sound absorption performance.

Experimental Example 4

The sound absorption performance of the polyurethane foams of Examples 1 and 4 and Comparative Example 5 was measured and is shown in Table 4 below. Here, the frequency band was 0.4 to 10 kHz.

TABLE 4

| Item | Comparative Example 5 | Example 1 | Example 4 |
|---|---|---|---|
| Foam density | 85K | 75K | 75K |
| Sound absorption performance | 0.81 | 0.81 | 0.80 |

* Evaluation method (Alpha Cabin (ISO 345))

As can be seen from the results of Table 4, the polyurethane foams produced in Examples 1 and 4 showed almost the same sound absorption performance as Comparative Example 5 and had a foam density decreased by about 11%.

Experimental Example 5

Figure 2:
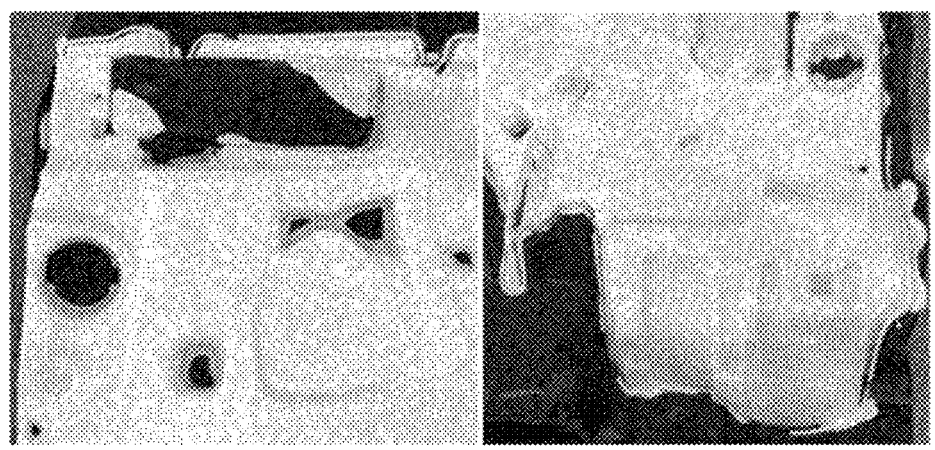
FIG. 2 shows the appearance of the polyurethane foam manufactured in the form of a dash isolation pad using the polyurethane foam composition of Comparative Example 1.
Figure 3:
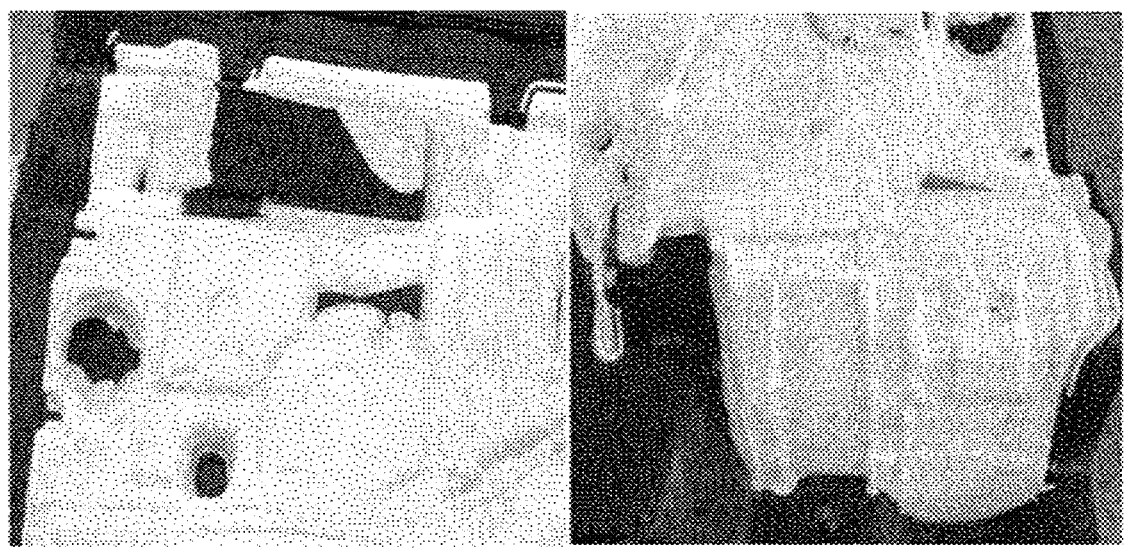
FIG. 3 shows the appearance of the polyurethane foam manufactured in the form of a dash isolation pad using the polyurethane foam composition of Example 2.

Polyurethane foams in the form of a dash isolation pad were produced using the polyurethane foam compositions of Comparative Example 5 and Example 2 in order to evaluate the appearance formability quality of parts of the polyurethane foam, and the results are shown in FIG. 1 (Comparative Example 5) and FIG. 2 (Example 1). Considering the fact that Comparative Example 5 has density characteristics of 85 kg/m$^3$ and 1,500 g/m$^2$ and Example 2 has density characteristics of 72 kg/m$^3$ and 1,270 g/m$^2$, it can be seen that the forming density is different but the appearance is identical.

Experimental Example 6

In order to evaluate the smell of the polyurethane foam, the polyurethane foams of Examples 1 and 4 and Comparative Examples 5 to 7 were subjected to sensory evaluation by five evaluators, and the results are shown in Table 5 below. Here, the size of the foam was 40 mm×50 mm×20 t in accordance with the evaluation standard MS300-34.

TABLE 5

| Item | | Comparative Example 5 | Comparative Example 6 | Comparative Example 7 | Example 1 | Example 4 |
|---|---|---|---|---|---|---|
| Odor evaluation | Evaluator 1 | 3.5 | 3.5 | 3.5 | 3.0 | 3.0 |
| | Evaluator 2 | 4.0 | 4 | 3.5 | 2.0 | 3.0 |
| | Evaluator 3 | 3.5 | 3.5 | 3.5 | 3.0 | 3.0 |
| | Evaluator 4 | 4.0 | 3.5 | 3.5 | 3.0 | 3.0 |
| | Evaluator 5 | 3.5 | 3.0 | 3.0 | 2.0 | 2.5 |
| | Arithmetic mean value | 3.7 | 3.5 | 3.4 | 2.6 | 2.7 |
| | Evaluation level (grade) | 3.5 | 3.5 | 3.0 | 2.5 | 2.5 |

As can be seen from Table 5, the polyurethane foams of Examples 1 and 4 have higher odor evaluation grade than those of Comparative Examples 5 to 7.

Experimental Example 7

The polyurethane foams of Examples 1 and 4 and Comparative Example 5 were used to measure the volatile organic substances of the polyurethane foams. The polyurethane foams were cut to a size of 100 mm×100 mm, sealed in a Tedlar bag and heated in the presence of 3 L of high-purity nitrogen in a dry oven set at 65° C. for 2 hours, and were then adsorbed on a DNPH cartridge and extracted. The results of HPLC apparatus analysis of formaldehyde emissions are shown in Table 6 below.

TABLE 6

| Comparative Example 5 | Example 1 | Example 4 |
|---|---|---|
| 141 µg/m$^3$ | 97 µg/m$^3$ | 102 µg/m$^3$ |

As can be seen from Table 6, less formaldehyde is released from the polyurethane foams produced using the polyurethane foam compositions of Examples 1 and 4, unlike in Comparative Example 5.

As is apparent from the foregoing, according to the present disclosure, it is possible to provide a polyurethane foam having a low density, satisfactory die formability and improved sound absorption compared to the prior art.

According to the present disclosure, it is possible to inhibit deterioration in quality uniformity of the polyurethane foam composition due to phenomena such as formation of precipitates of fillers such as carbon nanotubes, calcium carbonate, graphite and magnesium hydroxide, and layer separation.

According to the present disclosure, it is possible to provide a polyurethane foam having a reduced odor.

The effects of the present disclosure are not limited to those mentioned above. It should be understood that the effects of the present disclosure include all effects that can be inferred from the description of the present disclosure.

The disclosure has been described in detail with reference to variations thereof. However, it will be appreciated by those skilled in the art that changes may be made in these forms without departing from the principles or spirit of the disclosure, the scope of which is defined in the appended claims and their equivalents.

What is claimed is:

1. A method of manufacturing a low-density polyurethane foam for sound-absorbing materials comprising:
    adding an additive to a polyol to prepare a polyol mixture;
    adding isocyanate to the polyol mixture to prepare a polyurethane foam composition; and
    foaming the polyurethane foam composition,
    wherein the additive comprises a gelling catalyst, a blowing catalyst, a cell opener, a chain extender, a crosslinking agent, a foaming agent, a surfactant, and a reducing agent, and
    wherein based on 100 parts by weight of the polyol, the polyol mixture comprises:
        3.0 to 3.8 parts by weight of the gelling catalyst;
        0.3 to 0.5 parts by weight of the blowing catalyst;
        4.4 to 6.4 parts by weight of the cell opener;
        1.0 to 1.4 parts by weight of the chain extender;
        0.55 to 0.65 parts by weight of the crosslinking agent;
        4.85 to 4.95 parts by weight of the foaming agent;
        3.4 to 4.4 parts by weight of the surfactant; and
        2.3 to 2.5 parts by weight of the reducing agent.

2. The method according to claim 1, wherein the polyol mixture is stirred at 1,500 to 1,800 rpm for 30 to 60 minutes after adding the additive to the polyol, and
    the polyurethane foam composition is stirred at 6,000 to 8,000 rpm after adding the isocyanate to the polyol mixture.

3. The method according to claim 1, wherein the polyurethane foam composition is foamed in a die,
    a pressure of the foaming is 120 to 160 bar,
    a temperature of the polyurethane foam composition is 18 to 28° C., and
    a temperature of the die is 50 to 70° C.

4. A low-density polyurethane foam for sound-absorbing materials manufactured by the method according to claim 1, having a density less than 75 kg/m$^3$.

* * * * *